(No Model.)
C. A. WOODBURY.
BICYCLE.
No. 506,454. Patented Oct. 10, 1893.
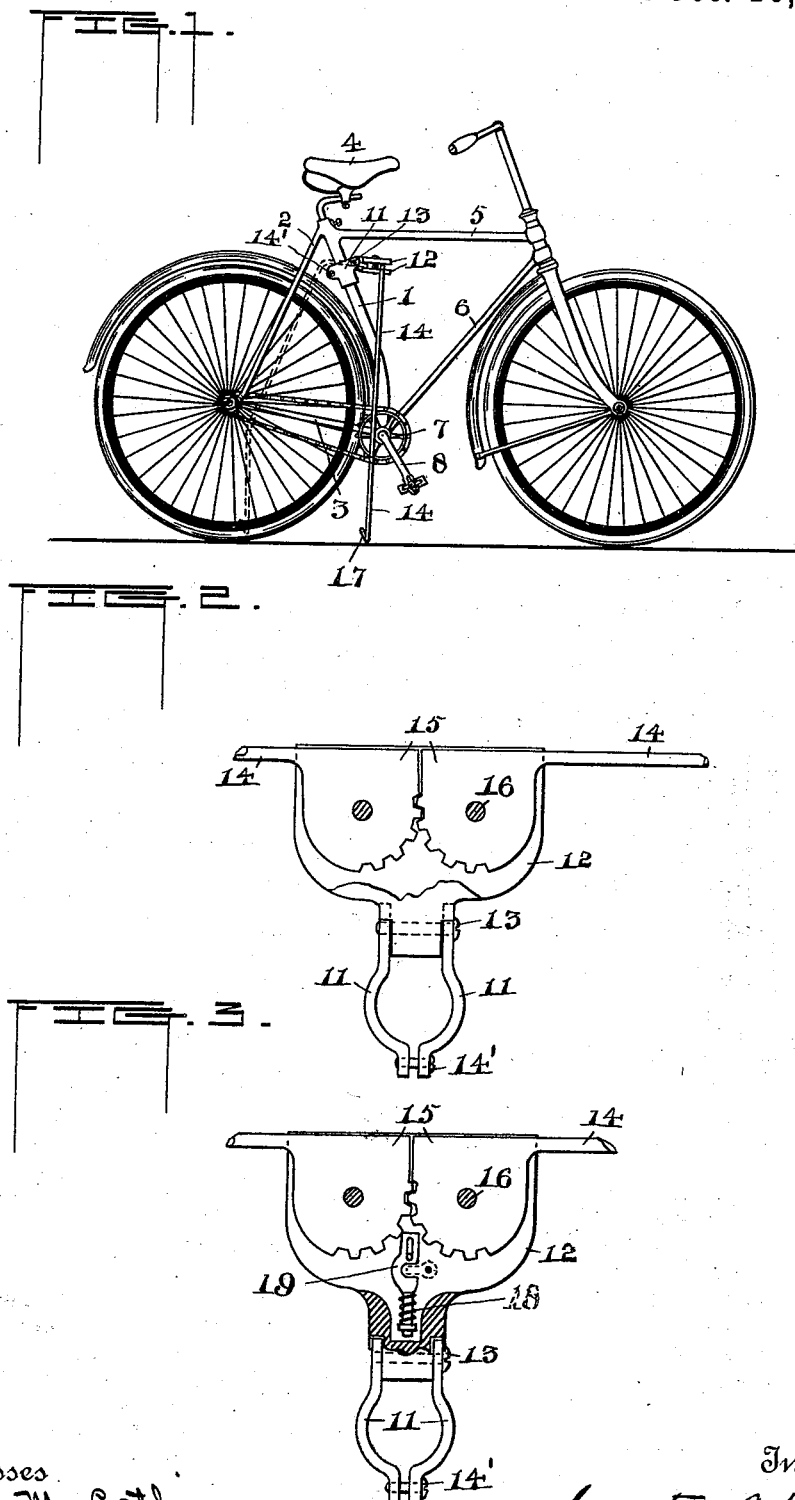
Witnesses
Arch. M. Catlin
Stephen Voyles.
Inventor
Crayton A. Woodbury
by
Benj. R. Catlin Attorney

UNITED STATES PATENT OFFICE.

CRAYTON A. WOODBURY, OF RUTLAND, VERMONT.

BICYCLE.

SPECIFICATION forming part of Letters Patent No. 506,454, dated October 10, 1893.

Application filed August 12, 1892. Serial No. 442,930. (No model.)

*To all whom it may concern:*

Be it known that I, CRAYTON A. WOODBURY, a resident of Rutland, in the county of Rutland and State of Vermont, have invented certain new and useful Improvements in Bicycles; and I do hereby declare the following to be a full, clear, and exact description of the invention, such as will enable others skilled in the art to which it pertains to make and use the same.

The invention has for its object to provide simple, economical and convenient means for supporting a bicycle at rest and it consists in the construction hereinafter described and pointed out.

In the accompanying drawings, Figure 1 is a side elevation of the device applied to a bicycle. Fig. 2 is a partial plan on an enlarged scale, and Fig. 3 is a similar view of a modification.

In the present instance the invention is shown applied to a bicycle of the so called "safety" type.

Numeral 1 indicates the central supporting brace constituting a part of the bicycle frame and situated just in front of the rear wheel.

2 and 3 indicate bars connecting its head and foot respectively with the axis of said wheel and 4 denotes the seat. 5 and 6 denote bars or rods connecting the said post with the guiding post between the feet of which the forward wheel is supported.

7 is a sprocket wheel to receive a chain passing about a rear sprocket wheel in usual manner and 8 is one of the propelling cranks.

A detachable bracket is secured in the present instance upon the post 1 by means of a screw 14' which passes through flanges formed upon the separate parts 11 which constitute a sleeve adapted to embrace said posts. The forward flanged portions of the sleeve-sections 11 are rigidly secured to forwardly extended parallel plates 12 by a screw 13 or in any suitable manner. Between these plates are pivoted the bent legs 14 which are for this purpose provided with heads 15 each having gear teeth adapted to engage similar teeth on the other. 16 indicate pivots for said heads. The construction is such that when either leg is moved with the effect to turn its head about its pivot the other head and leg are also moved by reason of the gears. By this means the legs can be placed in operative position to support the bicycle or they can be moved back against the rear wheel and out of operative position. For this purpose the parts are so constructed and arranged that the axes of the heads 15 are inclined to a horizontal plane, whereby the feet 17 will be raised vertically to a safe distance above the ground, when the legs are swung back. In case the leg-supporting bracket is attached to a post, as illustrated herein, the head-supporting plates will be inclined to the axis of the bracket tube as shown.

It is a practically important feature of my improvement that the operative position of the props is near a plane passing through the center of gravity and also that they are attached at a point considerably above said center. As this necessitates their being moved over the position of the pedals they are suitably shaped to extend outwardly over said devices and are then bent downwardly to avoid spreading their feet too widely. The feet 17 may be made by bending the free ends of the same as shown. They are thereby rendered less liable to penetrate soft earth which might permit the bicycle to fall.

The use of the device is not confined to any particular variety of bicycles or bicycle frames. Neither is it essential that the parts carrying the legs be pivoted between two plates as it is obvious that they might be pivoted on the upper or lower side of a single plate. Neither is it essential that the bracket be made in three, four or any particular number of pieces.

In Fig. 3 is shown an illustration of a simple device for locking the legs in the operative position which prevents the surreptitious use of the machine. By means of a spring 18 the bolt 19 is normally held against the gears in such position as to prevent their rotation whereby they are locked until the bolt is withdrawn by a key.

I am aware that a swinging prop or safety device operated by a rack and pinion has heretofore been proposed and I do not broadly claim a device of this nature.

It is a characteristic of my improvement that a prop or leg is constructed to be supported to turn on its support near the seat and about at or above the level of the wheel whereby it may be conveniently operated by a person on the seat by simply manipulating the prop without the need of intermediate devices and particularly if the lock be not used, and whereby its efficiency as a prop is increased.

It is also characteristic of my prop that its operative position is between the wheels, its position of rest being beside a wheel whereby its efficiency as a prop is increased and its removal when at rest from the neighborhood of the treadle insured.

I am also aware that a prop has been provided with a spring catch, but such device is an insufficient protection against intermeddlers or thieves such as is provided by my spring lock.

Having thus described my invention, what I claim, and desire to secure by Letters Patent, is—

1. In a bicycle the seat post, the legs provided with gears secured on said post at or above the top of the wheel and inclined to the horizontal plane and at an angle to the legs said gears having pivots inclined to the vertical plane whereby swinging the legs laterally away from the side of the wheel and toward a plane passing between the wheels lowers said legs, substantially as set forth.

2. In a bicycle the wheels and pedals and a leg consisting of a single jointed piece provided with an offset pivotally connected to the bicycle frame near the upper plane of a wheel the pivot passing through the offset and inclined to the vertical plane whereby moving the leg about its pivot moves the leg both horizontally and vertically, said leg being continued in a straight line from the offset to the level of the pedal and then bent downwardly whereby the leg in operative position is in a plane between the wheels and extends over the path or position of a pedal without its foot being carried to an undue distance laterally, substantially as set forth.

3. In a bicycle the pivoted legs provided with gears whereby they are adapted to be moved into an operative supporting position near the propelling cranks in combination with a spring lock consisting of a bolt normally pressed between the teeth of the gears to lock the legs in either an operative or inoperative position and prevent the use of the machine, substantially as set forth.

In testimony whereof I have signed this specification in the presence of two subscribing witnesses.

CRAYTON A. WOODBURY.

Witnesses:
THOS. C. ROBBINS,
H. L. PEVERLEY.